United States Patent
Jordil et al.

(10) Patent No.: US 7,647,706 B2
(45) Date of Patent: Jan. 19, 2010

(54) SCANNING PROBE WITH CONSTANT SCANNING SPEED

(75) Inventors: Pascal Jordil, Ecotaux (CH); Siercks Knut, St. Gallen (CH); Bo Pettersson, London (GB); William Wilcox, London (GB)

(73) Assignee: Hexagon Metrology AB, Nacka Strand (SE)

( * ) Notice: Subject to any disclaimer, the term of this patent is extended or adjusted under 35 U.S.C. 154(b) by 11 days.

(21) Appl. No.: 12/053,164

(22) Filed: Mar. 21, 2008

(65) Prior Publication Data

US 2008/0257023 A1 Oct. 23, 2008

(30) Foreign Application Priority Data

Apr. 18, 2007 (EP) ................... 07106415

(51) Int. Cl.
*G01B 5/008* (2006.01)
(52) U.S. Cl. ......................... 33/503; 33/556
(58) Field of Classification Search ................. 33/503, 33/556, 557, 558, 559; 702/152, 153, 168
See application file for complete search history.

(56) References Cited

U.S. PATENT DOCUMENTS

| | | | | |
|---|---|---|---|---|
| 4,603,487 A | * | 8/1986 | Matsunata | 33/556 |
| 5,446,971 A | * | 9/1995 | Neumann | 33/503 |
| 5,895,442 A | | 4/1999 | Arndt et al. | |
| 6,568,242 B2 | * | 5/2003 | Nai | 33/503 |
| 6,587,810 B1 | * | 7/2003 | Guth et al. | 702/168 |
| 7,464,481 B2 | * | 12/2008 | Ishikawa | 33/503 |
| 2005/0132591 A1 | * | 6/2005 | Kojima et al. | 33/503 |
| 2008/0249737 A1 | * | 10/2008 | Jordil et al. | 702/152 |

FOREIGN PATENT DOCUMENTS

| | | |
|---|---|---|
| EP | 0402440 A | 6/1990 |
| EP | 1489377 A1 | 12/2004 |
| WO | 9007097 A | 6/1990 |
| WO | 2006114570 A | 11/2006 |
| WO | 2007017235 A | 2/2007 |

OTHER PUBLICATIONS

European Search Report for Application Serial No. EP 07 10 6415 dated Oct. 2, 2007.

* cited by examiner

*Primary Examiner*—G. Bradley Bennett
(74) *Attorney, Agent, or Firm*—Pearne & Gordon LLP

(57) ABSTRACT

A method for scanning a surface of a workpiece 1 at a constant scanning speed $/v_d/$ using a scanning probe 2 mounted on a support 3 on a coordinate measuring machine (CMM) 4. The CMM contains a first set of drive means (6, 7, 8) to move the support according to three linear axis (x,y,z), and the support 3 contains a second set of drive means (14, 17) for actuating the movement of the scanning probe 2 with two degrees of freedom relative to said support 3. The method involves control means 33 coupled to the sets of drive means (6, 14, 17), and memory means for storing theoretical profiles and coordinates of the surface to scan.

12 Claims, 4 Drawing Sheets

SCANNING PROBE WITH CONSTANT SCANNING SPEED

FIELD OF THE INVENTION

The present invention concerns a method for scanning the surface of a workpiece and a related apparatus.

DESCRIPTION OF RELATED ART

Numerous methods for scanning are known, in which a mechanical probe is fixed on a machine spindle which traverses the surface of a workpiece in straight lines over each possible direction (x,y,z). After each line is completed the machine spindle moves the probe to a new position displaced from the completed line and repeats the movement along a parallel line.

One major drawback of these methods known from the art is that they are relatively slow for scanning complex forms, since the whole machine needs to be moved backwards and forwards while covering the whole scanning area of the surface. Furthermore, the accelerations and decelerations of the machine can introduce inaccuracies in the measurement process because of the strong inertia forces due to the large mass of the pieces in charge of positioning the surface detecting device. As a result, elastic deformations induced by inertia forces can affect negatively the measures.

In order to minimize the inertia effects and thus guarantee better precision results, constant speed scanning apparatus have been introduced, as in EP1489377. These scanning apparatus are yet not suited for non rectilinear movements.

Other scanning apparatus involving rotating movements of a probe are also known. Such scanning methods are, in contrast, very well suited for surfaces with spherical or cylindrical forms, but not for plane surfaces. U.S. Pat. No. 5,895,442 describes an example of such a probe allowing for constant speed scanning along cylindrical or spherical surfaces thanks to stored corrective values.

EP0402440 discloses a scanning apparatus which copes more efficiently with surfaces dealing with more complex profiles. The apparatus allows for additional degrees of freedom in rotation on top of the linear movements according to the conventional (x,y,z) axes. The probe consists of a stylus that is mounted on a head of a measuring machine, whereby the head includes shafts that can rotate about two orthogonal axes. The orientation of the stylus can take any direction so that the tip keeps the contact with the surface to be scanned. This way, the scanning can be carried out more efficiently along curved paths while the inertia effects are minimized thanks to the light weight of the stylus. However, this apparatus does not take into account cinematic effects to evaluate the deflecting forces applied on the probe, so that the precision is not optimal. Furthermore, those cinematic effects amplify the abrasion on the tip of the probe due to friction forces applied along the scanning path.

BRIEF SUMMARY OF THE INVENTION

The aim of the present invention is to overcome the limitations of the solutions known from the prior of the art.

According to the invention, these aims are achieved by means of a method for scanning a surface of a workpiece 1 at a constant scanning speed $/v_a/$ using a scanning probe 2 mounted on a support 3 on a coordinate measuring machine (CMM) 4. The CMM contains a first set of actuators 6, 7, 8 to move the support according to three linear axis (x,y,z), and the support 3 contains a second set of actuators 14, 17 for actuating the movement of the scanning probe 2 relative to said support 3. The CMM including a controller 33 coupled to the sets of actuators 6, 7, 8, 14, 17.

This method comprises the steps of:
(i) determine a value for the scanning speed;
(ii) operate the sets actuators 6, 7, 8, 14, 17 to position the probe tip 25 in contact with the surface 1;
(iii) operate the first set of actuators 6, 7, 8 to move the support 3 along a determined trajectory 36;
(iv) operate the second set of actuators 14, 17 to produce, simultaneously with the relative movement of the support 3 with respect to the surface, movements of the scanning probe 2 relative to the support 3.

The controller 33 adjusts the actuation of both sets of drive means 6, 7, 8, 14, 17 along a scanning path 37 in order to maintain the scanning speed equal to the determined value $/v_a/$ on at least segments 40 of the scanning path 37.

This invention fulfils the need in the measuring field of a scanning apparatus that can scan all types of surfaces efficiently, e.g. through oscillatory movements, while maintaining a very accurate precision during the whole measurement process, possibly over the whole scanning path. The feature of a constant scanning speed also improves the lifetime of the probes by reducing the overheating due to greater friction forces in acceleration phases.

Another benefit of the disclosed scanning apparatus is a simple sampling process in order to provide an even distribution of discrete points whose coordinates need to be measured on a surface along the scanning path. Indeed the points will be equally spread along the scanning path by simply setting regular time intervals for the sampling.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
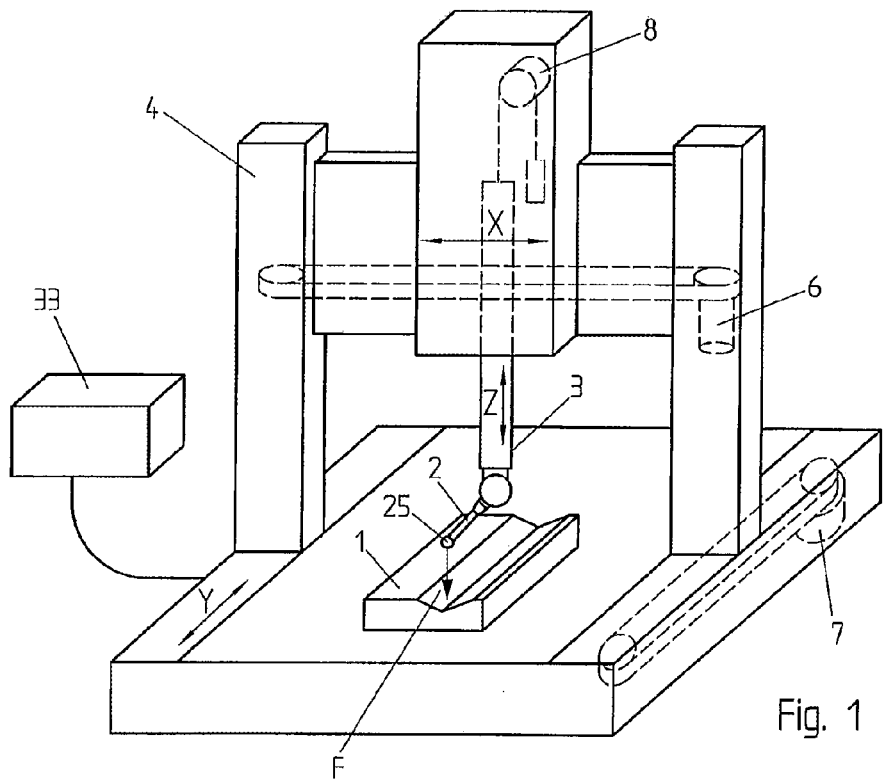
FIG. 1 shows a coordinate measuring machine and the scanning apparatus for the application of the present invention

A coordinate measuring machine 4 is disclosed in FIG. 1 according to a preferred embodiment of the invention. Such a machine 4 is also known as CMM. The CMM 4 comprises a scanning probe 2 attached to a support 3. The support 3 can be moved in any linear direction (X, Y, Z), whereas the scanning probe 2 has two degrees of freedom in rotation with respect to the support 3. In this example, the axes for the rotation of the probe are vertical, respectively horizontal, but other combinations of axes could be considered (e.g. two independent orthogonal horizontal axes, or any number of rotational axes, or any combination of rotational and linear degrees of freedom).

Figure 2:
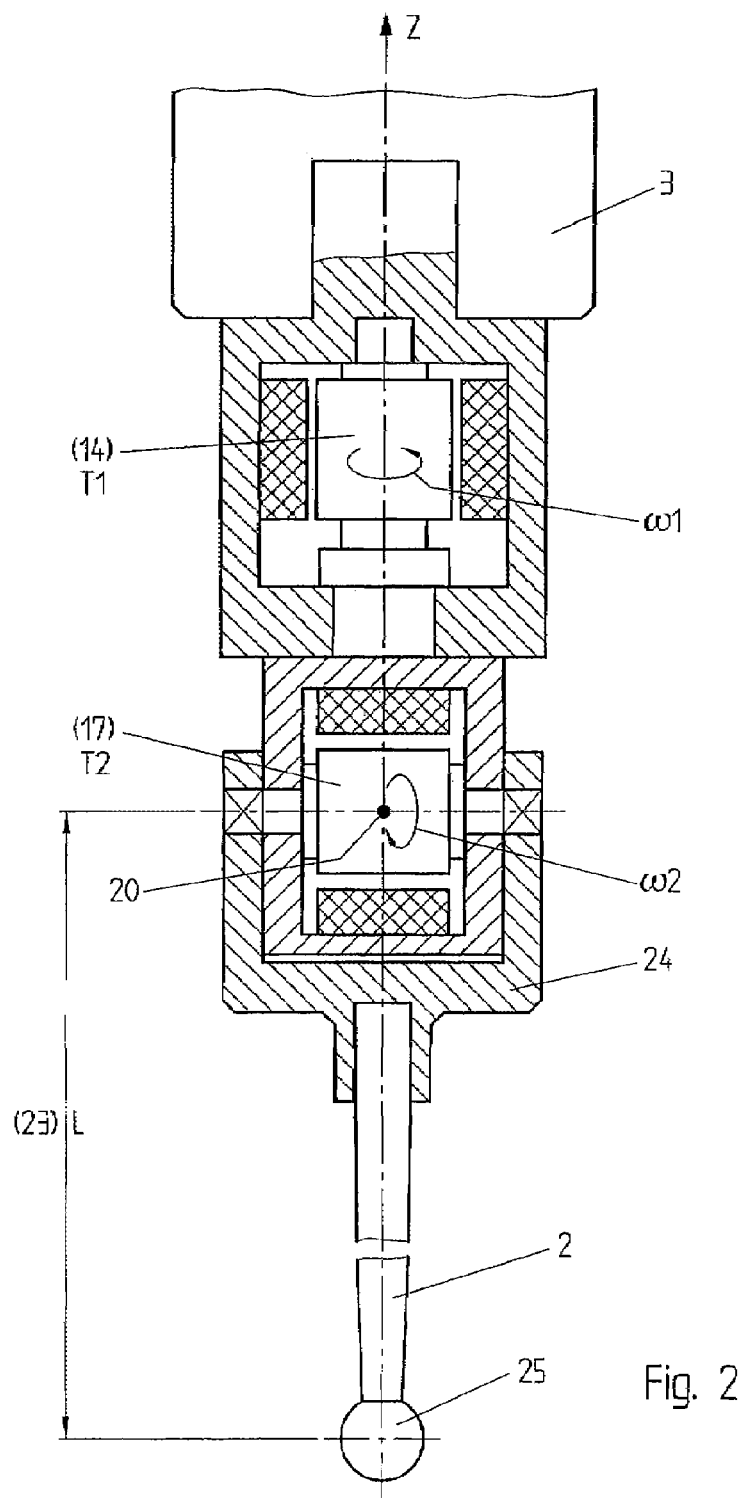
FIG. 2 is a section showing the mounting of the probe.

According to the circumstances, the CMM could be equipped with several kind of measuring probes, including, for example, but not exclusively:

a contact probe, as represented in FIG. 2, wherein a touch sphere is urged against the surface under measurement, and the coordinates of the contact point are computed by taking into account the deflection of the probe, given by a strain gauge or other appropriate transducer;

a laser probe (not represented) in which the probe shines one or more laser beams on the surface, and gives the distance along the light paths;

an optical probe, based on a micro imaging device or machine vision system.

The following description will be made with special reference to the first case of a touch-type probe 2, which is brought by the CMM 4 in contact relationship to the points of the surface 1 whose coordinate are to be measured, along a scanning path. This is not, however an essential feature. In the case of a non-contact probe, the method of the invention would equally be applicable, by aligning the probe with those points of the surface whose coordinates are t be measured. Generally the invention includes the steps of bringing the measuring probe, with the CMM, in a measuring relationship with points of the surface whose coordinates are to be measured, along a scanning path that is followed at constant speed.

In the following, the directions "vertical" and "horizontal" are used with reference to the conventional orientation f a CMM, as illustrated on FIG. 1. It must be understood, however, that such orientation are used here for sake of clarity, and do not represent limitations of the invention, which can be implemented in other kinds of measuring apparatus, arbitrarily oriented in space.

Support 3 is movable in any linear direction (X, Y, Z) thanks to a first set of drive means represented schematically, in FIG. 1, by electric motors 6, 7,8, by way of example. The positions of support 3 relative to axes X, Y, Z are measured by means of suitable encoders (not represented). Preferably, actuation of motors 6, 7, 8 and the measures provided by the encoders are controlled and processed by a digital controller 33 of the CMM (visible in FIG. 1). The controller is also responsible for reading the positioning of the encoders, and the output of the measuring probe, and to translate this data in coordinate of points of the surface 1.

Figure 4:
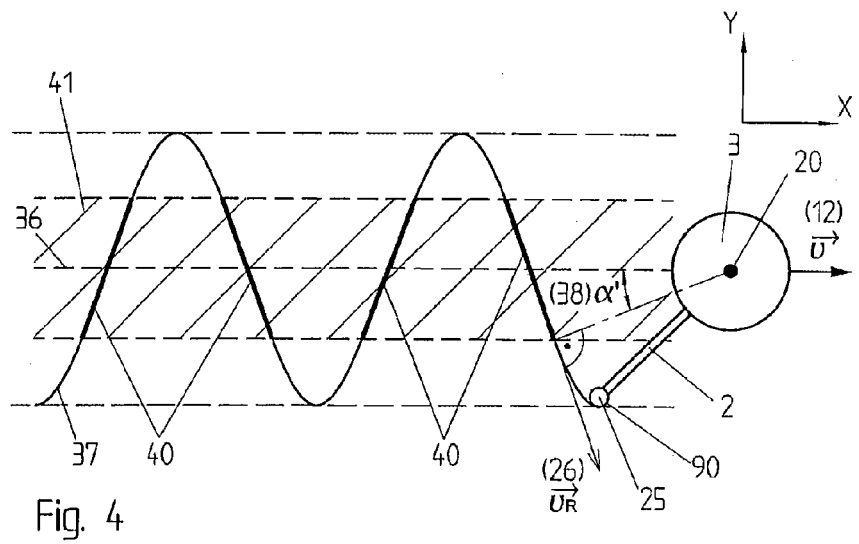
FIG. 4 shows a top view of the scanning path followed by the probe and illustrates the speed vector composition.

Since most of the components of the support 3 are quite heavy, the trajectory 36 followed by the support 3, shown further on FIG. 4, is preferably rectilinear, or at least is characterized by low acceleration levels in order to minimize the inertia effects.

In contrast to support 3 the probe 2 is made of light material. While the support 3 is positioned to determine roughly an area to scan and moved along a preferably straight trajectory 36, the probe 2 is meant to make the scanning more efficient in providing more reference points and coordinate measures over the surface 1. In order to do so, the probe 2 can be moved transversally to the instantaneous direction of the rectilinear trajectory 36 with rotating movements relatively to the support 3. These rotary movements can be oscillatory movements, for example. They are actuated by a second set of drive means 14, 17, whose goal can be on one hand to determine angular speeds $\omega_1$, $\omega_2$ according to a corresponding axis, but can also on the other hand be to apply a torque $T_1$, $T_2$ allowing to keep the contact with the surface 1 while doing it. The tip of the probe 25, preferably spherical, can thus be maintained in contact with the scanned surface 1, while the scanning is performed at a constant speed $V_s$ that is defined later in this document. The contact force F between the tip of the probe 25 and the surface to scan 1 is defined as the opposite of the reaction applied by the surface on the probe tip 25. This contact force also illustrated on FIG. 1 is hence normal to the plane tangent to the point of contact with the surface 1.

FIG. 2 is a section showing the mounting of the probe 2 on the support 3 and how the movements are actuated by the second set of drive means. Preferably this second set of drive means is made up by two actuators 14, 17. The first actuator 14 actuates a central shaft along the axis Z, and is preferably an electric motor. The probe head 24 fits onto the bottom of the shaft, thereby fixing the probe 2 and transmitting the rotational movements to the probe 2. The derived angular speed of the rotational movements according to this axis is also referred to as $\omega_1$.

The probe head 24 is designed so that the probe 2 can also freely rotate around another axis, whereby this second axis is orthogonal to the first axis (Z in this example) but its direction in the plane depends on the position of the central shaft. The second actuator 17 actuates the rotational movements along this second axis, and is preferably also an electric motor. The derived angular speed of the rotational movements according to this axis is also referred to as $\omega_2$.

In this example we assume, for the sake of simplicity, that the two axes of motors 14, 17 meet in one point in space 20, even if it is not necessarily always the case. The skilled person would be able to see that our derivations and the methods of the invention apply equally to the general case. This point 20 is the centre of both rotational movements and represents possibly the centre of a Galilean reference system when the support 3 is moved at a constant rectilinear speed. The length of the probe 23 allows to determine the position of the contact point between the tip of the probe 25 and the intersection of the two axes 20, and thus in turn to derive the absolute coordinates of the contact point, since the coordinates of the point 20 along the trajectory 36 are known, as explained further in FIG. 3.

Figure 3:
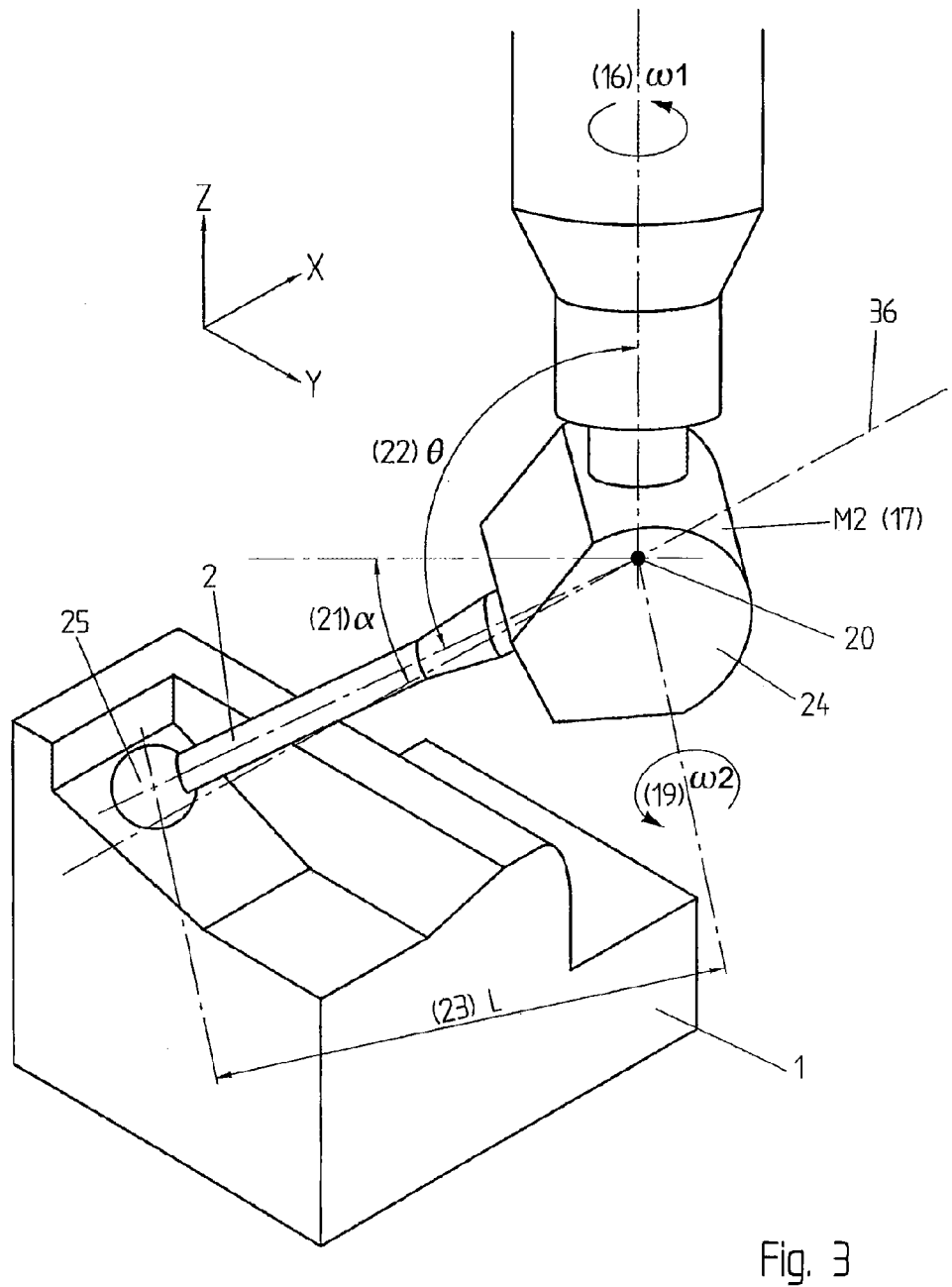
FIG. 3 shows a 3D view of the scanning probe and its angular positions.

FIG. 3 shows how the absolute coordinates of the probe tip 25 are obtained. They are determined by the angular positions $\alpha$, $\Theta$ of the probe according to the axes of rotation. A simple transformation of the spherical coordinates (L, $\alpha$, $\Theta$) into linear coordinates (X, Y, Z) yields the absolute coordinates. The orientation of the probe 2 in any direction ($\alpha$, $\Theta$) provides a greater scanning flexibility since it allows to scan without losing the contact with a workpiece having a multiple angled surface 1 while the probe head 24 simply moves along a rectilinear trajectory 36. Furthermore, the inertia effects are minimized in taking a light weight stylus 2, as opposed to its heavy weight support 3. The absolute coordinates of the probe tip 25 moves along the scanning path 37 that is made up by all contact points between the probe tip 25 and the surface 1. In a preferred embodiment of the invention, the absolute coordinates 44 are stored in memory means.

FIG. 4 shows a potential scanning path on a plane surface (x, y), and explains the composition of the speed vector on the probe tip 25. The surface to scan 1 is represented by the dashed surface; it is here comprised within the plane (x,y) but could span the three dimensions of space (x,y,z). The trajectory 36 of the support 3 is the rectilinear dotted line, which can point in any direction. The intrinsic movements of the probe combined with the movement of the support 3 along the trajectory 36 determine the scanning path 37 that is followed by the tip of the probe 25 and, at the same time, by the measured point 90. It is important to note that the measured point 90 corresponds to the contact point between the tip of the probe 25 and the surface under measurement 1 in the case of a contact probe, but this is not necessarily the case if the invention is applied to a contactless measuring system, for example an optical probe. Although FIG. 2 only shows the projection of this path in two dimensions, this path is not confined to a plane and can also span the three dimensions of space, according to curvature and shape of the object under measurement.

In order to keep the magnitude of the speed vector 26 at the level of the probe tip 25 constant, the sum of the two composing speed vectors, namely the speed vector v of the support on one hand, and the relative speed vector $v_r$ of the relative movement of the probe tip 25 with respect to the support on the other hand, must provide, by vector composition, a constant value or, or at least a value constant within a given approximation range, so that the accelerations are small and the friction forces do not wear away the tip of the probe 25 too quickly, while the inertia forces also remain negligible. The centre of the coordinate reference system for the relative movements of the probe is chosen as the point 20 of FIG. 2 that is also shown on the top view of FIG. 4. Other choices of coordinates are however possible.

In the case of a plane surface as shown in FIG. 4, the relative speed of the point under measure, with respect to the centre 20 of the support 3 is represented by the vector $v_r$. Assuming that the angle α is variable according to a predefined motion law α=α(t), while the angle Θ is fixed, in this example. The horizontal distance between centre 20 and the contact point 90 is given by the constant quantity R=L·sin(Θ). Hence the coordinates $x_r$, $y_r$ of the contact point 90 relative to the centre 20 will be given by:

$$x_r = -R \cdot \cos(\alpha(t)) \quad \quad 1)$$

$$y_r = R \cdot \sin(\alpha(t))$$

and the corresponding horizontal components $v_{rx}$ and $v_{ry}$ of the relative speed vector $v_r$ by:

$$v_{rx} = R \cdot \sin(\alpha(t)) \cdot \dot{\alpha}(t) \quad \quad 2)$$

$$v_{ry} = R \cdot \cos(\alpha(t)) \cdot \dot{\alpha}(t)$$

We have taken, for simplicity, a path 36 for the head 3 parallel to the X axis the translation speed of the head 3. In this case, which is straightforward to generalize, the motion of the head 3 is fully described by its x coordinate $x_h(t)$ and by the relative velocity $v(t) = dx_h/dt$. The absolute speed $v_a$ of the measure point 90 with respect to the object under measurement has then components:

$$v_{ax} = v(t) + R \cdot \sin(\alpha(t)) \cdot \dot{\alpha}(t) \quad \quad 3)$$

$$v_{ay} = R \cdot \cos(\alpha(t)) \cdot \dot{\alpha}(t)$$

Requiring constant absolute speed of the contact point $/v_a/ = K$ introduces a relationship between $x_h(t)$ and α(t)

$$\dot{x}_h(t) = \sqrt{K^2 - R^2 \cos^2(\alpha) \dot{\alpha}^2} - R \sin(\alpha) \dot{\alpha} \quad \quad 4)$$

where the right-handed part is fully known. Equation (4) is a separate-variables ordinary differential equation for $x_h(t)$ that can be easily integrated numerically, for any given set of parameters R, K, α(t), provided that the inequality $$K \geq |R \cos(\alpha) \dot{\alpha}| \quad \quad 5)$$

is satisfied, otherwise equation (4) has no real solutions. This corresponds to the fact that the value K must be sufficiently large to accommodate the speed imposed by the angular swing of the probe.

It can be observed that equation (4) could provide, in some cases, solutions in which $v(t) = dx_h/dt$ changes sign, which would correspond to a back-and-forth motion of the machine head 3. In many cases, however, it would be advantageous to chose the value of K, in relation to the amplitude and speed of oscillation in α, in order to obtain a motion of the head always in the same sense, to reduce oscillations and errors.

The controller of the CMM can therefore calculate, in real time or prior to the scanning, a path for the probe head 3, along which the translation speed is not strictly constant, but given by equation (4) above. In this way the measured tip 25 of the probe 2 will scan a series of points on the surface along a curvilinear path 37, resulting from the composition of the motion of the head 3 and of the probe 2, along which the measure point 90, corresponding to the point of contact in the case of a contact probe, moves with constant velocity $/v_a/ = K$.

It is of course not possible to impose a rigorous constant speed with infinite precision. The real speed of the point 90 will, in real cases, be affected by some error, due to the limitation of the machine and of the computing algorithm. In this case, the CMM can be programmed in such a way as to maintain the speed $/v_a/$ constant within some defined tolerance.

In some cases, particularly in presence of rapid swings of the probe 2, equation (4) could yield an expression for $x_h(t)$ that exceeds the dynamic limits of the CMM. It may be possible, for example, that the constancy of velocity can not be guaranteed in proximity of the inversion points in the oscillation of the probe 2. According to another aspect of the invention the CMM can be programmed to deal with such limitations. For example the speed may be kept constant in an area 41, or in selected segments 40 of the scanning path, in which the dynamic limitations of the CMM are not exceeded, and allowed to vary outside this area or these segments.

According to this preferred embodiment of the invention, it is possible to easily sample coordinates 44 regularly along the segments of the scanning path 40 on the scanning speed $/v_a/$ is constant. The time intervals simply need to be chosen equal so that the coordinates 44 sampled are equally spread along the scanning path 37. With this scanning method, it is hence easy to obtain an efficient distribution of the points to be measured in choosing adequately the values for the boundary and the sampling time interval Δt. The coordinates measured 44 can be stored in the memory of the controller on the fly.

In a preferred embodiment of the invention, not only the speed is maintained constant but also the deflecting force F applied to the tip of the probe 2 so that the coordinates measured along the scanning path 37 are as accurate as possible. To this end, while the angular speed 16 $\omega_1$ is maintained constant on segments of the scanning path 37 by the first motor 14, the second motor 17 is set to a constant torque T2. Although the following variant embodiment is not described, it would also be possible to maintain the torque T1 of the first motor 14 constant and the angular speed $\omega_2$ 19 of the second motor 17 constant. This possibility is suited for surfaces with a different orientation relative to the rotation axis of the probe.

Although this feature is not illustrated by any of the figures, it could be possible to put an accelerometer into the probe 2 so that the speed can be measured and compared the value that the invention strives to maintain at a constant level. This feedback feature could nevertheless be provided regardless from the correction features disclosed in this document.

The example above shows how the CMM can be programmed in order to follow a scanning path with the tip 25 of the probe (or, alternatively, measure a point 90 with a non-contact probe) while keeping a constant absolute scanning speed $/v_a/ = K$. It is clear that the invention can be extended to scanning along a path with a variable scanning speed following a predetermined speed profile $/v_a/ = v_a(t)$.

Although the previous example dealt with a quite simple case, the method of the invention can be extended to a complex path on a general surface in three dimensions.

According to a preferred three-dimensional embodiment of the invention, the parameters of the CMM axes, that is the position of X, Y, Z, $\alpha$, $\theta$ axes is precalculated, or calculated in real time, using inverse-kinematics transformations, in order to follow a scanning path 37 on a generic three-dimensional object, which is followed at constant speed $/v_a/=K$ or, according to a variant, following a predetermined speed profile $/v_a/=v_a(t)$.

We assume that the CMM status is determined by the value of the positions of all its degrees of freedom. In the case of the machine represented in FIGS. 1 and 2, the complete configuration is thus given by the position of all the axes of the machine, including the linear axes X, Y, Z and the rotation axes $\alpha$, $\Theta$. Each combination of these parameters corresponds to one defined position of the probe 2, and to one measured point 90. The parameters X, Y, Z, $\alpha$, $\Theta$ determine, additionally, also the orientation of the probe 2. This correspondence between machine parameters and coordinates of the measured point is usually indicated as forward kinematics transformation In general, particularly when the machine considered includes rotational degrees of freedom, the forward kinematics is not an injective correspondence, that is, one same position of the measure point can be obtained by several combinations of machine parameters. In this case, the FK transformation is not strictly invertible in a mathematical sense. It is however possible to calculate, for a given position of the measure point 90, a combination, among the several possible, of the parameters X, Y, Z, $\alpha$, $\Theta$ providing such measure point. This is indicated as an inverse kinematics operation or, in short, IK.

Several methods are known to perform reverse kinematics transformation, according to the properties of the machine. While direct inversion methods are known, inverse kinematics can often be regarded and implemented as a minimization problem, in the sense that an IK transformation is equivalent to finding a combination of machine parameters minimizing a distance between the probe tip and a desired target position. This is often advantageous when the displacements are small and a close solution is available as a starting point, and when a movement can be decomposed in a series of small consecutive displacement, as it will be the case further on.

The inherent ambiguity of inverse kinematics transformation can be useful, in that it allows imposing additional constraints to the solution. In the case of the CMM of the invention, for example, it would be possible to use an inverse kinematics calculation that not only brings the measuring probe to a selected measure point, but also maintains a constant inclination of the probe 2 with respect to the surface of the workpiece. In a minimization implementation, this can be obtained by adding a penalty factor to the minimized function, to take into account the orientation of the probe.

The control on the orientation of the probe is advantageous, because the measurement errors are dependent on the probe angle, both in contact probe and in non-contact probes. If an optical probe is used, for example, it is advantageous to have the optical beam orthogonal to the surface under measure.

According to a variant of the present invention, the CMM controller has a representation of a scanning path 37 which is to be followed by the probe 2. This could be an external input, for example a path provided by the operator or by a higher controller, or it could be generating internally by the controller, according to the circumstances. The scan path 37 is a full three-dimensional curve, corresponding to the profile of the piece to be measured.

Figure 5:
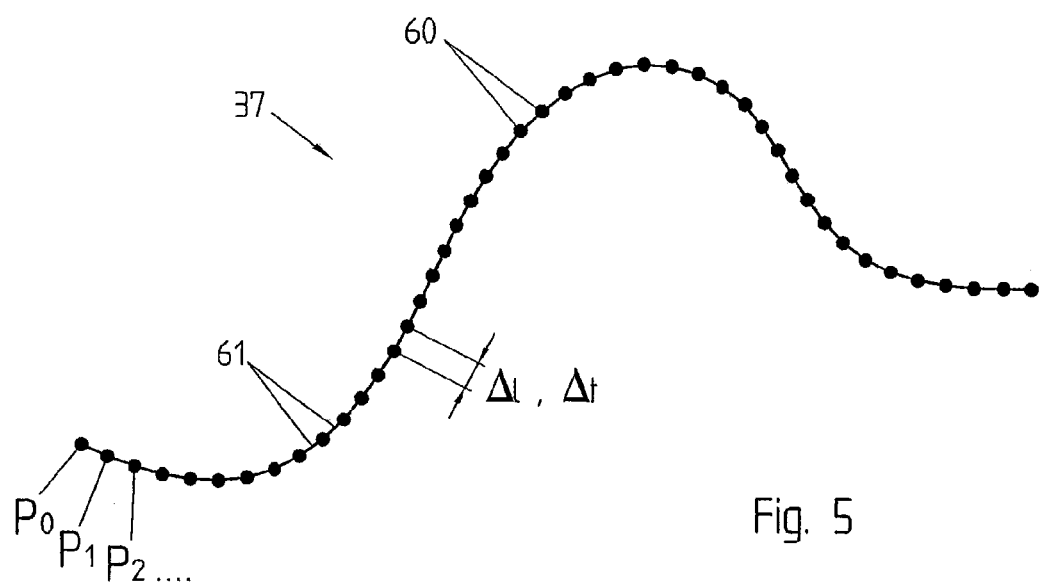
FIG. 5 explains how the speed adjustment process is carried out according to another aspect of the present invention.

As shown in FIG. 5, the scan path 37 is subdivided into segments 61. In this example all of the segments 61 have the same length $\Delta l$, because this simplifies the implementation of the algorithm of the invention; this feature is not however essential. Preferably the subdivisions 61 are sufficiently small to approximate the path 37 with a succession of straight segments.

Each segment 61 corresponds to a starting point and a target point to reach. The CMM brings the probe 2 in the position of the starting point $P_0$ of the first segment, which corresponds to a certain starting set of axes parameters $(X_0, Y_0, Z_0, \alpha_0, \Theta_0)$. The controller obtains, by an IK operation, a set of parameters $(X_1, Y_1, Z_1, \alpha_1, \Theta_1)$ corresponding to the end point $P_1$ of the same segment. The controller generates then instructions for the actuators of the CMM to modify the axes parameters from $(X_0, Y_0, Z_0, \alpha_0, \Theta_0)$ to $(X_1, Y_1, Z_1, \alpha_1, \Theta_1)$ in a determined time interval $\Delta t$. Consequently the probe 2 moves from $P_0$ to $P_1$ in the time $\Delta t$. The method then repeats to points $P_2$, $P_3$ and so on.

Thanks to the method of the invention as exemplified above, the probe 2 scans the path 37 with a constant velocity $/v_a/=\Delta l/\Delta t$. The method allows the probe to follow a complex three-dimensional path, respecting the shape of the object under measurement, at constant speed. the skilled person could also extend the method to the case of non-uniform segments, by adapting the time intervals accordingly, or to obtain a generic speed profile $/v_a/=v_a(t)$.

Preferably, the IK transformation imposes some additional desirable constraints, for example the inclination of the probe with respect to the workpiece's surface can be kept constant along the path 37. Also, the minimization algorithm can be adapted to prefer movement of the rotational axes over those of the linear axes, in order to minimize vibrations and errors.

While the probe 2 scans the path 37, the controller of the CMM also samples the coordinates of the measure points 60. This can be done for example in correspondence of the points $P_0, P_1, \ldots$ or at other positions along the path 37. If the sample is done at constant rate in time, the resulting measured points will also be uniformly distributed along the path 37.

According to a preferred variant of the invention, the method is carried out in real-time during the scan. The CMM controller calculates the IK transformations and generates the instructions for the actuator during the actual movement. This allows adapting the path 37 in order to follow deviations from a nominal profile, as derived from the coordinates of the sampled points 60. According to other variants, however, the movements could be fully or partly pre-calculated.

The inverse kinematics approach for adjusting the speed is also suited to make instantaneous corrections of the speed when the measured coordinates 44 do not match the theoretical coordinates 60 on the scanning path 37. Indeed, since the speed is derived from a difference in coordinates—origin and the target coordinates—and since the instantaneous coordinates are always known while scanning, the computation of the speed its adjustment to any desired value can be done easily and accurately on the fly, as long as the measured coordinates are themselves accurate.

If the CMM is equipped with a contact scanning probe 2, the deflection of the probe must be kept within very narrow limits in order to guarantee a reliable measure. In a typical case, the useful deflection range of the probe 2 is of about 1 mm, or less. Such precise knowledge a priori is not always possible. In many situations (for example in a quality control step of a production line) the CMM task is to scan precisely objects which may be affected by a large amount of inaccuracy.

In order to make sure that the coordinates are always provided with enough accuracy, it possible to modify in real time the scanning path 37 according to a compensation vector derived from the coordinates of points 60 already measured, and from the output of the deflection sensor in the probe. In this way the scan path 37 is constantly adapted, for any individual workpiece and dynamically along the scan, to maintain the deflection as constant as possible. If the transitions between the individual steps $P_0, P_1, \ldots$ are computed in real time, the system will still be able to follow the path at constant velocity $/v_d/$. Since constancy of deflection also means constancy of the contact force, the method of the invention also provides, when applied to a contact scanning probe, a constant contact force along a three-dimensional scan path 37 which is followed at constant speed or according to a chosen speed profile.

As seen previously, the IK transformation may, in some cases, result in impossible instructions, for example movements that go beyond the physical speed or acceleration limits of the CMM. In this case, the chosen path 37 can not be followed entirely at constant speed. The CMM can be programmed to cope with such a situation, for example by generating an error to raise the attention of an operator, calling a condition-handling procedure, or release the constraint of constant speed, until the algorithm is able to converge again.

The invention claimed is:

1. A method for scanning a surface of a workpiece using a scanning probe mounted on a support on a coordinate measuring machine, said CMM containing a first set of actuators to move said support according to three linear axis, said support containing a second set of actuators for actuating the movement of said scanning probe relative to said support, said CMM further comprising a controller, arranged to drive both said sets of actuators, said method comprising the steps of:
   (i) determine a value for the scanning speed;
   (ii) operate said first and second set of actuators to position the probe tip in contact with said surface;
   (iii) operate said first set actuators to move the support along a determined trajectory;
   (iv) operate said second set of actuators to produce, simultaneously with the relative movement of the support with respect to the surface, movements of said scanning probe relative to the support;
   whereby said controller adjust the actuation of both said sets of actuators along a scanning path in order to maintain the scanning speed equal to said determined value on at least segments of said scanning path.

2. The method of claim 1, whereby the movements of said scanning probe relative to the support are transversal to the instantaneous direction of said trajectory.

3. The method of claim 1, whereby the movements of said scanning probe relative to the support are oscillatory movements.

4. The method of claim 1, whereby the adjustment carried out by said controller is made according to the angular position of said probe.

5. The method of claim 1, whereby the second set of actuators is operated in such a way as to maintain constant the inclination of the probe with respect to the surface of the piece to be measured.

6. The method of claim 1, wherein said probe is a contact probe, and wherein the second set of actuators is operated in such a way as to maintain constant the contact force (F) between the probe and the piece to be measured.

7. The method of claim 1, wherein said probe is a contactless optical probe.

8. The method of claim 1, further comprising a step of sampling coordinates at regular time intervals along said scanning path.

9. The method of claim 1, whereby the adjustment carried out by said controller is made according to at least one inverse kinematics transformation.

10. The method of claim 9, said at least one inverse kinematics algorithm using coordinates equally spaced over said scanning path.

11. A computer program product for carrying out the method of claim 1.

12. A method for scanning a surface of a workpiece using a scanning probe mounted on a support on a coordinate measuring machine, said CMM containing a first set of actuators to move said support according to three linear axis, said support containing a second set of actuators for actuating the movement of said scanning probe relative to said support, said CMM further comprising a controller, arranged to drive both said sets of actuators, said method comprising the steps of:
   determine a value for the scanning speed;
   operate said first and second set of actuators to position the probe tip in contact with said surface;
   subdivide notionally a scanning path on said surface in a succession of segments, each segment having a start point and an endpoint;
   operate said first and second set of actuators to position the probe tip at the start point of the first segment of said succession; and
   for each segment in the succession:
      obtain, by an inverse kinematic transform, a set of parameters of the CMM bringing the probe tip at a the end point of the segment; and
      generate instructions for said first and second set of actuators to modify the parameters of the CMM to said set of parameters in a determined time interval to cause the probe tip to scan the scanning path with a constant velocity equal to said determined value for the scanning speed.

* * * * *